United States Patent [19]

Proksch et al.

[11] 3,935,364

[45] Jan. 27, 1976

[54] POROUS, HEAT-SENSITIVE SUBSTRATES COATED WITH SYNTHETIC RESINS

[75] Inventors: Emil Proksch; Helmut Eschweiler, both of Vienna, Austria

[73] Assignee: Eternit-Werke Ludwig Hatschek & UCB,S.A., Saint-Gilles-lex-Bruxelles

[22] Filed: Jan. 11, 1974

[21] Appl. No.: 432,487

Related U.S. Application Data

[63] Continuation-in-part of Ser. No. 194,026, Oct. 29, 1971, abandoned.

[30] Foreign Application Priority Data

Oct. 30, 1970 Austria .............................. 9779/70

[52] U.S. Cl. .................... 428/304; 427/44; 427/54; 428/316; 428/443; 428/454; 428/512; 428/513; 428/514; 428/539
[51] Int. Cl.².. B05D 3/06; B32B 3/00; B32B 13/00; B32B 21/00
[58] Field of Search .......... 117/93.31; 260/29.6 RB, 260/875; 204/159.15; 427/44, 54; 428/304, 316, 443, 454, 512, 513, 514, 539

[56] References Cited
UNITED STATES PATENTS

| | | | |
|---|---|---|---|
| 2,998,330 | 8/1961 | Snyder et al. ................ | 260/29.6 RB |
| 3,471,386 | 10/1969 | D'Alelio ............................. | 117/93.31 |
| 3,645,984 | 2/1972 | Dowbenko et al. ............... | 117/93.31 |
| 3,719,728 | 3/1973 | Miranda ............................. | 117/93.31 |

*Primary Examiner*—J. H. Newsome
*Attorney, Agent, or Firm*—Haseltine, Lake & Waters

[57] ABSTRACT

Heat-sensitive porous substrates such as wood, plywood, plyboard, particleboard, fiberboard, cardboard, paper, fiber cement, asbestos cement, concrete and natural stone are coated with a synthetic resin by mixing an aqueous dispersion of 100 parts by weight of a saturated synthetic resin with 2 to 40 parts by weight of an organic liquid consisting of a mixture of 70 to 10 percent by weight of at least one mono ethylenically unsaturated compound having a boiling point of less than 190°C. and 30 to 90 percent by weight of at least one ethylenically unsaturated compound having a boiling point of at least 190°C. in order to swell the resin particles; applying the mixture to the substrate to form a film thereon and hardening the film with UV radiation or with electron radiation to form a hard smooth surface coating on the substrate.

18 Claims, No Drawings

POROUS, HEAT-SENSITIVE SUBSTRATES COATED WITH SYNTHETIC RESINS

CROSS REFERENCE TO RELATED APPLICATION

This application is a continuation-in-part of Ser. No. 194,026 filed Oct. 29, 1971 now abandoned.

BACKGROUND OF THE INVENTION

It has long been known and customary to produce paints and other coatings for decorative and/or protective purposes on the most diverse types of substrates from aqueous dispersions of synthetic resins. For this purpose, very finely divided aqueous dispersions of thermoplastic or elastomeric saturated synthetic resins are applied to the object to be coated and the water present in the dispersion is removed by evaporation, soaking up by the support or both at the same time, whereby the synthetic resins particles now coming into close contact can form a continuous film. For this film-forming, a certain plasticity of the synthetic resin is required.

This plasticity can be characterized either by the hardness of the synthetic resin material or by the film-forming temperature (minimum filming temperature M.F.T.), which means the minimum temperature required for forming a continuous, homogeneous film, of the separate synthetic resin particles. This temperature can be determined, e.g., according to the method of Th. Protzman and G. Brown, Journal of Applied Polymer Science 4, 81 (1960.) A further characteristic value is the glass transition temperature $T_g$, that is the temperature above which the polymer molecules attain a certain free mobility. It approximately corresponds to the temperature at which the polymer softens (softening point) and can be determined, in addition to other methods, by means of the thermomechanical penetration method. According to this method, $T_g$ is derived from the penetration rate of a calibrated probe tip under constant load into the coating film heated at a linear rate of 5°C per minute. The M.F.T. in a first approximation is a linear function of the $T_g$.

Synthetic resin dispersions which are to form a continuous film (M.F.T. < room temperature) necessarily are to consist of very soft, plastic material and therefore also yield soft, not very strong coating of low glass transition temperature. If the dispersion is composed of a harder synthetic resin (high M.F.T. and high $T_g$,) the dispersion applied to the substrate must be heated to a higher temperature in order to soften it above the M.F.T. and thus make possible the forming of a film. The result after cooling off is then a film of adequate continuity which is still hard enough.

But in many cases, the temperatures required for this are too high for practical application, in particular when the substrates are sensitive to heat. Due to the great advantages of dispersions as pain and coating media, respectively, (high content of solids — about 50 percent and high molecular weight of the synthetic resin — from about $10^5$ to about $10^7$, at still low viscosity of the total dispersion, which makes for an easy and well reproducible application to the substrate; good suitability for storage; low combustion hazard; no escaping of solvent vapors through the freshly applied coating layer, etc.) it is desirable, however, to make possible the application of dispersions in these cases also. The film-forming temperature M.F.T. can be influenced at constant hardness (constant $T_g$) of the dispersed synthetic resin by other parameters also. The diameter of the dispersed particles, nature and amount of the surfactants employed and the type of substrate exert only a minor influence; but it is possible to substantially reduce the M.F.T. by the addition of so-called plasticizers (coalescing agents.) These agents have a dissolving or swelling effect on the synthetic resin and at the same time reduce M.F.T. as well as $T_g$. A multitude of organic solvents for this purpose has been suggested in pertinent literature. But plastification by the addition of solvents cannot be considered a satisfactory solution of this problem, as this can only be done at the expense of several of the essential advantages in employing aqueous dispersions. The solvents previously added must be removed again after film forming in order to obtain a strong film in the end, this requires either a very long period of volatilization in air (during which the film is still soft and tacky) or further thermal treatment. In addition, the weight loss during this volatilization brings about flaws in the uniform film structure, financial losses and the forming of undesirable solvent vapors.

An attempt was made, for instance, to apply coatings to a substrate by simultaneously spraying onto it a synthetic resin dispersed in an organic carrier liquid (i.e. organosol) and a solvent, optionally on monomer basis, and to harden them there. The disadvantages of this process consist in the fact that on the one hand, technologically complicated devices are required for the simultaneous spraying of organosol and solvent and application by means of rollers or brushes is impossible and, on the other hand, fluctuations in the quantity ratios of the two components bringing about irregularities in the properties of the finished coating cannot be prevented. Moreover, there is only little time available for the required swelling of the synthetic resin particles by means of the solvent.

Further specified is a process for the production of coatings according to which an unsaturated synthetic resin is mixed with a monomer and a suspension prepared from these two components is applied to a metal base by means of an electric field and there polymerized. The range of application of this process is limited to specific types of synthetic resins with a certain number of double bonds and acid groups in the polymer molecule, which makes for a correspondingly costly and complicated production process. Moreover, the substrates are limited to electrically conductive media and even in these, technologically elaborate devices are required for the application of the coatings.

Furthermore, it is known to produce articles comprising a metallic substrate coated by applying a mixture of an aqueous dispersion of a saturated acrylic resin with a diethylenically unsaturated monomer and hardening the film obtained from that mixture by thermocatalytic means. Obviously, this process cannot be used for the production of articles comprising heat-sensitive substrates.

SUMMARY OF THE INVENTION

Object of the present invention is to create an article comprising a heat-sensitive porous substrate having a hardened synthetic resin coating thereon, obtained in a process free of the disadvantages mentioned above and by means of simple application methods, which at the same time ensures a high quality of the coating under retention of the advantages arising from the employment of aqueous dispersions.

According to the invention, said coated article has been obtained by mixing an aqueous dispersion of at least one saturated synthetic resin with a polymerizable organic liquid which is a swelling agent for said resin, said liquid containing 70 to 10 percent by weight of at least one mono-ethylenically unsaturated compound having a boiling point of less than 190°C and 30 to 90 percent by weight of at least one ethylenically unsaturated compound having a boiling point of at least 190°C, applying the mixture obtained to said substrate to form a film thereon and finally hardening the film by exposure to irradiation with electrons or to UV radiation.

The term "saturated" is intended to mean that the synthetic resins in question do not contain polymerizable or, respectively, co-polymerizable double bonds incorporated on purpose, such as is the case in the unsaturated polyester resins or the unsaturated acrylic resins suitable for curing by means of exposure to irradiation by electrons. The presence of trace amounts of olefinic double bonds formed as the result of impurities, secondary reactions in the production or by the disproportionation reaction in bimolecular chain termination in the course of the polymerization reaction employed in the production is not precluded in this. Moreover, the overall chemical structure of the synthetic resin is not to be restricted by this and, vice versa, the presence of a certain chemical or structural arrangement is not required.

Suitable as said polymerizable liquids which are swelling agents for said saturated synthetic resin are liquids capable of polymerization, or, respectively, graft polymerization onto the synthetic resin of the dispersion induced by non-thermal methods. Said polymerizable liquids, next to the additives required or favorable for carrying out polymerization, such as, for instance, UV-sensibilizers, accelerators, chain regulators, etc., comprise said mixture of lower and higher boiling ethylenically unsaturated compounds in a ratio as defined above, said compounds having at least one activated olefinic double bond in their molecule.

The addition of the polymerizable organic liquid to said aqueous dispersion of at least one saturated synthetic resin prior to application brings about the desired plastification of the synthetic resin. The stirred-in polymerizable liquid first forms an individual phase separate from the synthetic resin in the form of small droplets dispersed in water. This state is then converted — more or less fast depending upon the conditions — into more stable states in which the polymerizable liquid is incorporated into the particles of said saturated synthetic resin and causes these to swell, first on their surfaces but then also internally. These swelled states are characterized from the outset by the fact that at least the surface of the synthetic resin particles is swelled, and is thereby made soft and even tacky, respectively, without seriously decreasing the stability of the dispersion. The intimate contact between the synthetic resin particles after soaking up of the water present in the dispersion layer after application leads to the formation of a continuous film. Once that film has formed from the plastified synthetic resin grains, plastification can be reversed by conversion of the added organic liquid into its polymeric, solid form and thereby, a well-cured coating can be produced. This conversion can be effected either by polymerization of the organic liquid employed per se or by its graft copolymerization onto the polymer structure of said saturated synthetic resin employed, or, respectively, by means of both procedures taking place simultaneously.

If multifunctional monomers are contained within said polymerizable liquid, crosslinking of the saturated synthetic resin can also take place. Thus, the plastification is not only reversed, but the final coating film obtained may be much harder than corresponding to the starting material.

It has been found by the applicants that the polymerizable liquid to be admixed to the aqueous dispersion has to meet certain requirements. As already described, a mixture of 70 to 10 percent by weight of at least one monoethylenically unsaturated compound having a boiling point of less than 190°C (i.e. a "low boiling monomer") and 30 to 90 percent by weight of at least one ethylenically unsaturated compound having a boiling point of at least 190°C (i.e. a "high boiling monomer", which can be either a mono- or polyfunctional monomer) is used. It has been discovered by the applicants that such mixtures in an optimal manner combine supreme plasticizing ability with supreme radiation curability when admixed with aqueous dispersions of saturated synthetic resins. The first property causes the minimum film forming temperature of the said dispersions to decrease very strongly which makes such compositions most suitable for use with heat-sensitive substrates and especially with substrates which additionally are porous (since the minimum film forming temperature is higher on porous substrates than for instance on metal substrates.) Diethylenically unsaturated compounds alone are much worse plasticizers and furthermore are much more costly than the said mixtures.

The second property mentioned, namely, the supreme radiation curability of the said monomer mixture when added to an aqueous dispersion of a saturated synthetic resin, is by no means obvious. It is well known that a great number of monomers which are easily curable by thermocatalytic means are not curable by radiation. This difference is related to the much higher radical concentration present during radiation hardening as compared with thermocatalytic hardening. This greatly favors bimolecular chain termination as compared to chain propagation. For instance, methyl methacrylate, styrene, or a mixture of 20 percent by weight of ethylene glycol dimethacrylate and 80 percent by weight of methyl methacrylate cannot be polymerized by electron beam irradiation despite being easily curable by heat.

It must be further pointed out that it is well known to mix monomers with unsaturated resins to make them radiation polymerizable.

The existence of numerous processes using said combination proves that doubt existed against the possibility of curing a mixture of saturated synthetic resins and monomers by UV or electron beam irradiation. These doubts have prevented the experts in the art from trying to cure coating films obtained from mixtures of polymerizable monomeric liquids and aqueous dispersions of saturated synthetic resins by radiation means.

It is thus most surprising that the mixtures defined by the present invention have been found to be radiation curable at any rate.

The type of procedure described above not only achieves the object of the present invention, that is of providing articles with flawless coating films having been obtained from aqeuous dispersions of relatively hard, saturated synthetic resins applied to heat-sensitive portous substrates, but beyond this, it makes possible the production of articles comprising heat-sensitive porous substrates having decorative and/or protective coatings with new properties not obtainable by any other method. By variation of the production conditions, in particular by using different kinds of saturated synthetic resins and different kinds of low and high boiling monomers, articles having coatings of the most diverse chemical compositions and most diverse structure may be obtained, which was not possible up to now. This also makes possible the variation of the properties of the coated articles within a wide range.

The advantages inherent in the use of aqueous dispersions are preserved in this to a large extent. The processibility of the dispersions is generally little or not at all changed by the addition of monomers. The storability of aqueous dispersions to which monomers have been added is generally quite acceptable. The shelf life can, as has surprisingly been found, extend over periods of many months and even more. Where shelf life is short, the liquid merely has to be added to the dispersion shortly or immediately prior to processing without any disadvantages. The combustion hazard of dispersions to which monomers have been added is only slightly higher than that of conventional synthetic resin dispersions. Since the polymerizable liquid as defined above is not evaporated like a solvent after the film has been applied to the substrate, but instead is incorporated into the coating, the problem of nuisance arising from potential combustible and/or poisonous vapors before hardening is done is negligible.

Finally, the particles of the saturated synthetic resin swollen by the mixture of monomers which are present in the aqueous dispersion, also retain the property of not penetrating into the substrate; in spite of the porosity of the substrate, they form a hard smooth coating on it. Only the water contained in the mixture of the aqueous dispersion of the resin and the monomers is soaked up by the substrate after applying the mixture. As compared to this, a solution of a synthetic resin would penetrate into the substrate and effect an impregnation but not a coating.

The production of the articles according to the present invention having a hardened decorative or protective coating thereon therefore represents a new process principle of great practical significance.

A further important and unexpected advantage of the invention consists in the fact that the surfaces of the articles obtained become hard and tack-free even when curing in the presence of air. It is known that oxygen has inhibiting effect in radical polymerization reactions. The surface must therefore be protected from air when coating films are produced by polymerization of polymerizable or copolymerizable solutions. This type of protection is usually offered by curing under an inert protective gas free of oxygen or by covering the surface with a paraffinic oxygen barrier such as is usual, for instance, in the thermocatalytic polymerization of unsaturated polyesters dissolved in styrene. When producing coated articles according to the present invention, the influence exerted by oxygen on the polymerization rate was surprisingly small. Curing can easily be done in air (which has important economic advantages) and the surfaces obtained are tackfree and of outstanding quality even when hardened in the presence of air.

The processes for the production of coatings on the articles according to the present invention thus possess extreme adaptability to the conditions and the properties of the starting materials as well as to the requirements to be met by the final products. If the step of separating the admixture of the polymerizable organic liquid from the process step of application to the substrate to be coated is omitted, that is to say, if the aqueous dispersion and the polymerizable organic liquid are sprayed onto the substrate simultaneously in one operating procedure, this adaptability is completely lost. In addition, the simultaneous application of two components in a ratio constant as far as time and spece are concerned (over large areas of thin coatings) is difficult to realize in actual technical practice.

After the aqueous dispersion to which the liquid has been added is applied to the respective temperature-sensitive substrate according to a known method — such as painting, pouring on, spraying on, — the water in the thin layer applied is removed by letting it be absorbed by the substrate and/or by evaporation. There is the possibility, already during this process and of course afterwards, up to the time of the complete curing, that part of the polymerizable organic liquid added also volatilizes. But contrary to water, the organic compounds are present not in the form of an individual phase, but dissolved in the saturated synthetic resin and therefore have a much lower vapor pressure and a lower evaporation rate even when their boiling point is lower than that of water. As a result, if the dispersion coating applied to the substrate is quickly freed of water (e.g., if the substrate has good absorption properties) and is subsequently cured by means of a fast and non-thermal method, i.e. by irradiation with ultraviolet light or with electron beams, the amount of evaporating organic liquid, even of the monoethylenically unsaturated monomers with a boiling point of less than 190°C, is acceptably small.

The last step of the processes for obtaining the articles according to the invention, namely, the polymerization or, respectively, graft copolymerization of the organic liquid added, is effected according to two methods known per se.

The films applied to the temperature-sensitive substrates are hardened quickly and without essential development of heat by means of irradiation with UV-light or with high energy electrons. Both methods have the advantage that the hardening occurs very quickly, within seconds or even fractions thereof. When hardening by means of UV light, the addition of a UV sensibilizer is necessary. Known sensibilizers which can be used in conjunction with the present invention are: benzoin, its ethers or esters, benzophenone, anthraquinone and their derivatives, aromatic disulfides; O-alkylxanthates, bis-xanthogen disulfides, alpha-haloketones, haloacetic acids and sulfonyl chlorides. UV-induced hardening, however, is restricted to coatings whose absorption in the wavelength range used is not so high that the undermost parts of the coating applied are not sufficiently irradiated. For this reason, only UV-transparent additives, such as, for instance, $CaSO_4$, $SiO_2$, etc., can be used. The possible thickness of the coating is limited for the same reason.

In irradiating with electrons, these limitations do not apply. No sensibilizers need be added, the polymerizable liquids can be added even in the inhibited state, which makes the storability of the system practically unlimited. The same applies to all limitations with regard to temperature during the addition of the liquid and subsequent storage. It is also possible to harden strongly filled or pigmented coatings even of greater thickness. Particularly advantageous is the use of irradiation by electrons with a penetrating capacity sufficient for penetrating the coating layer, but not, or at least very little, the substrate underneath. For conventional coating thicknesses, this requires average energies of about 50 to 500 keV. If required, irradiation can be effected under a protective gas free of oxygen instead of in air, but generally this is not necessary.

Polymerization of the organic liquid present in the saturated synthetic resin particles in dissolved form is greatly facilitated in comparison to polymerization of the pure liquid, due to the gel effect. The high viscosity of the system brings about strong increases of the polymerization rates, independently of the hardening being done either by means of UV or electron irradiation. Besides the polymerization of the liquid added per se which leads to a mixture of the synthetic resin orginally present with one newly formed, there occurs a graft copolymerization of the liquid onto the polymer structure of the synthetic resin employed, that is to say, a chemical bond between old and new synthetic resin. While the graft copolymerization plays but a secondary role in hardening by means of UV irradiation, as it can only occur as the result of occasional chain transfers, it is a major reaction in hardening by means or irradiation by electrons. For in this case, the chain-starting radicals are mainly formed in the polymer chain of the saturated synthetic resin used as a starting material and the monomeric units of the organic liquid are grafted onto these radical positions. But in addition to this, a nongrafting polymerization of the liquid added per se also occurs during hardening by means of electrons. IF di- or multifunctional monomers are present in the mixture making up the polymerizable liquid, these monomers will serve also as cross-linking agents for the starting as well as for the newly formed resin. This causes an additional increase in hardness and glass transition temperature $T_g$ of the final coating. It is possible therefore to start with resins of relatively low $T_g$ (which are easy to swell) and nevertheless end up with high quality hard and resistant coatings. The percentage of such di- or multifunctional monomers in the polymerizable liquid thus may serve as an important parameter controlling the hardness of the final coating.

DESCRIPTION OF PREFERRED EMBODIMENTS AND FURTHER OBJECTS OF THE INVENTION

The required amount of polymerizable organic liquid to be added may be varied within a wide range. It is subject, on the one hand, to the extent of the desired or required plastifying effect, — the more the film forming temperature of the aqueous synthetic resin employed is to be lowered or has to be lowered, respectively, the more liquid must be added, — on the other hand, it depends upon the solubility of the liquid in the synthetic resin and the properties of the solid or semi-solid solution formed.

Preferably, said polymerizable organic liquid is added in an amount of 2 to 40 parts by weight per 100 parts by weight of said saturated synthetic resin in said aqueous dispersion.

When adding lower amounts than that, the effect achieved, generally speaking, is negligible, if the amounts added are higher than that, the individual synthetic resin particles are converted to liquid droplets and the system loses the properties characteristic for a dispersion of solid particles.

According to the preferred embodiment of the invention, there is provided an article wherein said aqueous dispersion of said saturates synthetic resin is a dispersion containing between 20 and 60 percent by weight of at least one saturated synthetic resin selected from the group consisting of vinylic, acrylic, styrenic and urethane resins.

Examples of aqueous dispersions of vinylic resins are dispersions of polyvinyl chloride resins (vinyl chloride homopolymers, vinyl chloride-vinyl acetate copolymers and other copolymers of vinyl chloride,) examples for dispersions of acrylic resins are polymers and copolymers of various acrylic or methacrylic compounds, especially of acrylic esters or methacrylic esters, examples for dispersions of polystyrene resins are polymers and copolymers of styrene, with for instance acrylic esters, acrylic acid, etc. But mixtures of two or more different dispersions which are further processed after addition of a liquid plastifying both resins are also suitable for use.

But of course the additives conventionally used in a fully compounded coating, such as pigments, finely granulated fillers, etc., can be added to the aqueous dispersion of the saturated synthetic resin employed, in addition to the synthetic resin functioning as a binder, either before or after the addition of the polymerizable organic liquid which is a swelling agent for said resin. Among those additives are also those which are known to change the properties of the coating film in a characteristic manner, such as, for instance, silicones which make the film surface impermeable to water (such as, e.g., those according to Belgian Patent No. 542,765.) The effect of such additives is preserved for being employed in the production of articles according to the present invention.

According to a further preferred embodiment of the invention, an article is provided wherein said final hardening of said film is done by exposure to irradiation with electrons having an average energy of 50 to 500 keV. Said coating can contain at least one pigment or filler. The penetrability of electrons in said energy range is sufficient for curing coatings even heavily loaded with pigments and/or fillers.

In the case of employment of UV radiation for final hardening of the film applied to the heat-sensitive, porous substrate of the inventive articles, said coating contains at least 0.05 percent by weight of a photo initiator and, optionally, a UV-transparent filler.

According to a further preferred embodiment of the invention, an article is provided wherein said heat-sensitive porous substrate is a water- or humidity-containing material selected from the group consisting of wood, plywood, plyboard, particleboard, fiberboard, cardboard, paper, fiber cement, asbestos cement, concrete and natural stone. All the substrates enumerated above contain varying amounts of water or humidity. When an article consists of such water-containing material to which a still humid coating is applied, and this article is heated up to the necessary temperature for film formation, water is evaporated and frequently, this change in water content brings about a change in the structure of the substrate, as well. Evaporation of water usually results in dimensional changes of the substrate (shrinkage, warping, development of cracks, etc.,) said evaporation may also destroy the coating from just being formed by the vapor by the vapor stream which has to penetrate that layer. It is also known that concrete, fiber cement, asbestos cement and natural stone are particularly heat-sensitive in those cases whre large amounts of water are present in their pores or where, as in the case of freshly prepared concrete, fiber cement or asbestos cement, they still contain the preparation water. When employing the aqueous dispersion of at least one saturated synthetic resin mixed with the organic liquid defined above, it was found that heat-sensitive porous substrates which may be termed "wet", such as freshly prepared concrete, fiber cement or asbestos cement, can easily be supplied with such a coating without the article to which the coating is applied showing any deterioration.

A further object of the invention is an article comprising a heat-sensitive porous substrate having a hardened synthetic resin coating thereon, said coating having been obtained by mixing an aqueous dispersion of at least one saturated synthetic resin with a polymerizable organic liquid which is a swelling agent for said resin containing 70 to 10 percent by weight of at least one monoethylenically unsaturated compound selected from the group consisting of acrylic, methacrylic, vinylic, stryenic and allylic monomers having a boiling point of less than 190°C and 30 to 90 percent by weight of at least one ethylenically unsaturated compound having a boiling point of at least 190°C and selected from the group consisting of acrylic and methacrylic esters obtained by partial or complete esterification of polyalcohols, allylic esters of polybasic acids, maleic-unsaturated acids, maleic-unsaturated acid anhydrides and divinyl- or polyvinyl-substituted aromatic hydrocarbons, applying the mixture obtained to said substrate to form a film thereon and finally hardening the film by exposure to irradiation with electrons or to UV radiation.

Methacrylic, vinylic, styrenic and allylic monomers altogether are characterized by containing in their molecules the $\alpha,\beta$-unsaturated olefinic group

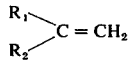

activated by at least one substituent R. It is customary to distinguish between different subgroups of that group of compounds, depending upon the nature of the substituents $R_1$ and $R_2$ (although sometimes all of these except the allylic monomers are summarized as vinylic monomers.)

For acrylic or methacrylic monomers, $R_1$ is the carboxyl group —COOH (or a derivative of that group, such as —COOR, —CONH$_2$, —CN, etc.) and $R_2$ is either the methyl group —CH$_3$ (for methacrylic monomers) or hydrogen (for acrylic monomers.) The group of acrylic and methacrylic monomers especially includes acrylic and methacrylic acid, acrylonitrile, methacrylonitrile, acrylamide, methacrylamide, and the esters of acrylic and methacrylic acid with alcohols.

Vinyl monomers are characterized as being derivatives of the hypothetical compound vinyl alcohol ($R_1 =$ OH, $R_2 =$ H.) They incude especially esters of said alcohol with organic or inorganic acids, such as, e.g., vinyl acetate, vinyl propionate, vinyl chloride, etc., as well as other derivatives such as, e.g., vinylidene chloride, vinyl sulfonic aicd, etc.

For styrenic monomers, $R_1$ must be an aromatic or heteroaromatic ring. Examples of such styrenic monomers are styrene, vinyl toluene, vinyl carbazole, vinyl pyridine, etc.

Allylic monomers are characterized by $R_1$ being a substituted methyl group —CH$_2$R and $R_2$ being the hydrogen atom. Examples are the ethers and esters of allyl alcohol.

Maleic-unsaturated compounds, which may form part of the high boiling monomers, are characterized by the group —CO—CH =CH—CO—. Examples are maleic, fumaric and itaconic acid, maleic anhydride, etc.

A prominent example for the group of divinyl- or polyvinyl-substituted aromatic hydrocarbons is divinyl benzene.

From this results a large number of potential combinations. The only limitation to the number of possible combinations of saturated synthetic resin and the polymerizable organic liquid is imposed by the requirement of the synthetic resin being sufficiently swelled by the liquid.

This, in general, is the case (but not only then,) when the liquid consists of a mixture of compounds having a chemical structure (not taking into account the double bond) which is similar or identical to that of the saturated synthetic resin. For this reason, it is of advantage to employ mixtures of liquids containing a large amount of styrene for polystyrene dispersions and mixtures consisting for the major part of acrylic and methacrylic acid esters for acrylic resins. But even when the structural similarity between the synthetic resin and the liquid added is lacking, there are numerous possibilities for combinations also meeting the requirement mentioned above.

Preferably said polymerizable organic liquid is added in an amount of 2 to 40 parts by weight per 100 parts by weight of said saturated synthetic resin in said aqueous dispersion.

In order to achieve the above defined object of the invention, it is preferred to provide an article wherein said heat-sensitive porous substrate is a water- or humidity-containing material selected from the group consisting of wood, plywood, plyboard, particleboard, fiberboard, cardboard, paper, fiber cement, asbestos cement, concrete and natural stone.

A further object of the invention is an article comprising a heat-sensitive, water- or humidity-containing porous substrate selected from the group consisting of wood, plywood, plyboard, particleboard, fiberboard, cardboard, paper, fiber cement, asbestos cement, concrete and natural stone, having a hardened synthetic resin coating thereon, said coating having been obtained by mixing an aqueous dispersion of at least one saturated synthetic resin selected from the group consisting of vinylic, acrylic, styrenic and urethane resins with a polymerizable liquid which is a swelling agent for said resins containing 70 to 10 percent by weight of at least one monoethylenically unsaturated compound selected from the group of acrylic, methacrylic vinylic, styrenic and allylic monomers having a boiling point of less than 190°C and 30 to 90 percent by weight of at least one ethylenically unsaturated compound having a boiling point of at least 190°C and selected from the group consisting of acrylic and methacrylic esters obtained by partial or complete esterification of polyalcohols, allylic esters of polybasic acids, maleic-unsaturated acids, maleic-unsaturated acid anhydrides and divinyl- or polyvinyl-substituted aromatic hydrocarbons, said polymerizable liquid being added in an amount of 2 to 40 parts by weight of said saturated synthetic resin in said aqueous dispersion, applying the mixture obtained to said substrate to form a film thereon and finally hardening the film by exposure to irradiation with electrons or to UV radiation.

In order to achieve the above defined objects of the invention, it is preferred to provide an article having a hardened coating thereon wherein said final hardening of said film is done by exposure to irradiation with electrons having an average energy of 50 to 500 keV. This method of curing is applicable also in the case where an article is desirable the coating of which contains at least one pigment or filler.

In the case where a hardening of the film applied to the substrates by exposure to UV radiation is desirable, said coating contains at least 0.05 percent by weight of a photo initiator and optionally a UV-transparent filler.

In order to achieve the above mentioned objects of the present invention, it is also preferred to provide an article having a coating thereon wherein said aqueous dispersion of at least one saturated synthetic resin contains between 20 and 60 percent by weight of saturated synthetic resin.

In the following, the nature of the invention is explained in detail by means of examples; the range of application of the present invention, however, is by no means limited by the choice of these examples.

EXAMPLE 1

An aqueous dispersion of methyl methacrylate/ethyl acrylate copolymer (weight ratio of two copolymerization components 50 : 50) of a solid content of 40 percent by weight was mixed under stirring with 6 percent by weight of a mixture of n-butyl methacrylate and ethylene glycol dimethacrylate (in weight ratio 1 : 2.) The mixture thus obtained is completely stable and storable. After a week, the mixture thus obtained was sprayed onto an asbestos cement plate 5 mm thick ( 10 × 15 cm) to give a coating of about 75 g/m$^2$. After an airing period of two minutes at room temperature, the sample was irradiated in air with a dose of 3 Mrad of fast electrons (acceleration voltage 300 kV, beam current 10 mA, conveying speed 25 m/min.) The result is an asbestos cement plate having a flawless, well adhering, crack-resistant coating. The hardness of the coating was determined according to the Konig pendulum hardness method (DIN 53 157) and was 103 sec.

In a comparative test, without the addition of the polymerizable liquid, no continuous film was obtained. In a further comparative test without the addition of the polymerizable liquid, the film sprayed on was heated with the substrate to 60°C. The result was an asbestos cement plate covered with a coating film whose pendulum hardness, however, amounts to only 70 sec.

EXAMPLE 2

Example 1 was repeated, but the polymerizable liquid added consisted of a mixture of methyl acrylate and butylene glycol dimethacrylate in a weight ratio of 1 : 2 instead of n-butyl methacrylate and ethylene glycol dimethacrylate. The result is an asbestos cement plate coated by a flawless, strongly adhering, crack-resistant coating with a pendulum hardness of 95 sec.

EXAMPLE 3

97.8 parts by weight of the dispersion described in Example 1 were mixed under stirring with 12.2 parts by weight of a mixture of n-butyl methacrylate and ethylene glycol dimethacrylate (in a weight ratio 1 : 2.) The mixture thus obtained is completely stable and storable. After a week, 60 parts of an aqueous dispersion of a polymethyl phenyl siloxane resin with a solids contents of 15 percent by weight were added and the mixture thus obtained was sprayed on and irradiated as described in Example 1. The result is an asbestos cement plate having a flawless smooth, strongly adhering and crack-resistant coating with a pendulum hardness of 94 sec.

EXAMPLE 4

Example 3 was repeated, but the polymerizable liquid used was a mixture of methyl acrylate and butylene glycol dimethacrylate in a weight ratio of 1 : 2 instead of the mixture of n-butyl methacrylate and ethylene glycol dimethacrylate. The result is an asbestos cement plate comprising a flawless, smooth, strongly adhering, crack-resistant coating with a pendulum hardness of 89 sec.

EXAMPLE 5

Example 3 was repeated, but to the mixture of n-butyl methacrylate and ethylene glycol dimethacrylate, 10 percent by weight of carbon tetrachloride were added and the dimensions of the asbestos cement substrate were increased to 120 × 54 cm. The result is a flawless, strongly adhering, smooth and crack-resistant coating with a pendulum hardness of 94 sec. The sample was then divided and further tests were carried out on the individual parts. The samples did not show any deteriorations either after the boiling test (24 hours in boiling water) or after the frost test according to ONORM B 3422 (25 frost-thaw cycles at 3 hours each at −20°C and 1 hour at +20°C in water.)

EXAMPLE 6

An aqueous dispersion of a copolymer consisting of methyl methacrylate, ethyl acrylate, acrylonitrile and acrylic acid (in a weight ratio of 73 : 15 : 10 : 2) with a solids content of 36 percent by weight was mixed under stirring with 13 percent by weight of a mixture of methyl acrylate and butylene glycol dimethacrylate in a weight ratio of 1 : 2. The mixture thus obtained is completely stable and storable. After a week, it was applied and irradiated according to Example 1. The result is an asbestos cement comprising a flawless, strongly adhering and crack-resistant coating with a pendulum hardness of 127 sec.

In comparative tests without the addition of the polymerizable liquid, no coherent films which adhered to their substrates wre obtained even when heating the film applied and the substrate to temperatures up to 150°C.

EXAMPLE 7

The dispersion described in Example 1 was mixed with 5 percent by weight of a mixture of n-butyl methacrylate and ethylene glycol dimethacrylate (in a weight ratio of 40 : 60.) The mixture obtained is completely stable, its storability is the same as that of the dispersion used as starting material. The mixture thus obtained was spray-coated onto an ashwood veneered plywood board of 6 mm thickness (13 × 20 cm) to form a wet coating of 107 g/m$^2$. This spray-coating can be done at any time after the addition of the acrylic mixture. After about 1 minute, the water is soaked up by the wood support and a continuous, uniform, closed but soft coating film with a pencil hardness of 2B forms at room temperature. The sample was subsequently irradiated in air with a dose of 3 Mrad of fast electrons (I.C.T. electron accelerator, 500 keV, 20 mA, conveying speed 30 m/min.) The result is a high quality plywood board coated with a hard film with a pencil hardness of 4H.

EXAMPLE 8

The dispersion specified in Example 1 was mixed with 5 percent by weight of a mixture of n-butyl acrylate and ethylene glycol diacrylate (in a weight ratio of 50 : 50,) and with 0.1 percent of benzoine methyl ether. This mixture is as stable and storable as the one produced according to Example 1. The mixture thus produced was spray-coated onto a solid board of maple wood (1 × 13 × 20 cm) to form a wet coating of 43 g/m². After 1 minute at room temperature, the water was completely soaked up by the substrate and the coated article was subjected for 5 minutes to the UV irradiation emitted by a 1000 Watt HTQ-4 UV lamp (Philips) at a distance of 10 cm. The result was a film with an open pore structure which could be lightly sanded to a decorative finish.

EXAMPLE 9

The dispersion specified in Example 1 was mixed with 6 percent by weight of a mixture of methyl acrylate and butylene glycol dimethacrylate in a weight ratio of 40 : 60. The mixture thus obtained is completely stable and storable. After 2 weeks, the mixture thus obtained was sprayed onto a 1,2 mm cardboard piece (20 × 20 cm) to form a wet coating of about 60 g/m². After 2 minutes, the sample was irradiated in air with a dose of 3 Mrad of fast electrons (I.C.T. electron accelerator, 500 keV, 20 mA, conveying speed 30 m/min.) The result is a uniform, well adhering coating. The coating is neither detached nor cracked when the cardboard is bent with a bending radius of down to 7 cm.

EXAMPLE 10

An aqueous dispersion (solids content 50 percent by weight) of a styrene resin, obtained by copolymerization of styrene, butyl acrylate acrylic acid (in a weight ratio of 73 : 25 : 2) has a minimum film forming temperature (M.F.T.) of 69°C. After addition of 8 percent by weight of a mixture of styrene and diallyl phthalate (in a weight ratio of 70 : 30) the M.F.T. is lowered to 17°C. IF the mixture thus obtained is spray-coated onto a 3 mm fiberboard (20 × 20 cm) up to a wet coating of about 120 g/m², a homogeneous soft coating film is formed after about 90 seconds. After irradiation in air with a dose of 3 Mrad of fast electrons (I.C.T. electron accelerator, 500 keV, 20mA, conveying speed 30 m/min) a tack-free, strongly adhering coating film with a pencil hardness of 4H is obtained on top of the fiberboard.

EXAMPLE 11

An aqueous dispersion (solids content 46 percent by weight) of a vinyl resin, obtained by copolymerization of vinyl chloride, vinyl acetate and maleic acid (in a weight ratio of 86 : 13 : 1) has a minimum film forming temperature of 36°C. To this dispersion, 6 percent by weight of a mixture of of polyethylene glycol diacrylate, butylene glycol diacrylate, vinyl acetate and maleic anhydride (in a weight ratio of 30 : 59 : 10 : 1) were added. The mixture thus obtained is completely stable and storable. After 1 week, the mixture was sprayed onto an ordinary sheet of writing paper up to a wet coating of about 25 g/m². After 5 minutes' drying at room temperature, the sample was irradiated in air with a dose of 2 Mrad of fast electrons (I.C.T. electron accelerator, 500 keV.) The result is a tack-free, strongly adhering, pliable coating.

EXAMPLE 12

Example 1 was repeated, but with the additional admixture of 0.1 percent by weight of benzoine methyl ether, and replacing the electron irradiation by irradiation of the sample for 5 minutes with a 1000 Watt Philips HTQ-4 UV lamp. The result is a flawless, well adhering, crack-resistant coating with a Konig pendulum hardness of 94 sec.

EXAMPLE 13

A coating dispersion produced by mixing 50 parts by weight of the dispersion of Example 1, 7 parts by weight of a 15 : 85 weight ratio mixture of ethyl acrylate and 2-hydroxyethyl acrylate and 43 parts by weight of a pigment dispersion with a solids content of 35% by weight containing a mixture of titanium dioxide, iron oxide black and calcium carbonate in a 1 : 4 : 2 weight ratio is spray-coated onto a concrete tile (40 × 30 × 2.5 cm) with a wet weight of 50 g/m². After a drying period of 2 minutes at room temperature, the coated tile is irradiated under the same conditions as indicated in Example 1. A hard decorative film of a hardness of 4H is obtained.

EXAMPLE 14

The dispersion of Example 1 was mixed with 8 percent of a mixture of n-butylacrylate and 2-hydroxypropyl methacrylate (in a weight of 10 : 90) and applied by spray-coating to a sample of particleboard (20 × 60 cm) of 22 mm thickness to a wet weight of 86 g/m². After drying for two minutes at room temperature, a soft, dry, homogeneous film is formed. The coated sample is exposed to irradiation with electrons to a total absorbed dose of 3 Mrad (500 keV, 20 mA.) A smooth, continuous film of a pencil hardness of 2H is obtained.

What we claim is:

1. An article, comprising a heat-sensitive porous substrate having a smooth, hard resin surface coating thereon, said coating comprising a room temperature cured mixture of (a) 100 parts by weight of at least one saturated synthetic resin which normally has a minimum filmforming temperature higher than room temperature on said porous substrate and (b) 2 to 40 parts by weight of an organic liquid which is a swelling agent for said resin, said liquid consisting of 70 to 10 percent by weight of at least one mono-ethylenically unsaturated compound having a boiling point of less than 190°C. and 30 to 90 percent by weight of at least one ethylenically unsaturated compound having a boiling point of at least 190°C.

2. An article according to claim 1 wherein said coating contains a least one member of the group consisting of pigments and fillers.

3. An article according to claim 1 wherein said coating contains at least 0.05 percent by weight of a photo initiator and a UV-transparent filler.

4. An article according to claim 1 wherein said heat-sensitive porous substrate is a water- or humidity-containing material selected from the group consisting of wood, plywood, plyboard, particleboard, fiberboard, cardboard, paper, fiber cement, asbestos cement, concrete and natural stone.

5. An article according to claim 1 wherein said saturated synthetic resin is at least one saturated synthetic resin selected from the group consisting of vinylic, acrylic, styrenic and urethane resins.

6. An article according to claim 1 wherein said coating contains at least 0.05 percent by weight of a photoinitiator.

7. An article comprising a heat-sensitive porous substrate having smooth, hard resin surface coating thereon, said coating comprising a room temperature cured mixture of (a) 100 parts by weight of at least one saturated synthetic resin which normally has a minimum film-forming temperature higher than room temperature on said porous substrate and (b) 2 to 40 parts by weight of an organic liquid which is a swelling agent for said resin, said liquid consisting of 70 to 10 percent by weight of at least one monoethylenically unsaturated compound selected from the group of acrylic, methacrylic, vinylic, styrenic and allylic monomers having a boiling point of less than 190°C and 30 to 90 percent by weight of at least one ethylenically unsaturated compound having a boiling point of at least 190°C and selected from the group consisting of acrylic and methacrylic esters obtained by partial or complete esterification of polyalcohols, allylic esters of polybasic acids, maleic-unsaturated acids, maleic-unsaturated acid anhydrides and divinyl- or polyvinyl-substituted aromatic hydrocarbons.

8. An article according to claim 7 wherein said coating contains at least one member of the group consisting of pigments and fillers.

9. An article according to claim 7 wherein said coating contains at least 0.05 percent by weight of a photo initiator and a UV-transparent filler and wherein said final hardening of said film is done by exposure to UV radiation.

10. An article according to claim 7 wherein said heat-sensitive porous substrate is a water-or humidity-containing material selected from the group consisting of wood, plywood, plyboard, particleboard, fiberboard, cardboard, paper, fiber cement, asbestos cement, concrete and natural stone.

11. An article according to claim 7 wherein said saturated synthetic resin is selected from the group consisting of vinylic, acrylic, styrenic and urethane resins.

12. An article according to claim 7 wherein said coating contains at least 0.05 percent by weight of a photoinitiator and wherein said final hardening of said film is done by exposure to UV radiation.

13. An article comprising a heat-sensitive, water- or humidity-containing porous substrate selected from the group consisting of wood, plywood, plyboard, particleboard, fiber-board, cardboard, paper, fiber cement, asbestos cement, concrete and natural stone, having a smooth hard resin surface coating thereon, said coating comprising room temperature cured mixture comprising (a) 100 parts by weight of at least one saturated synthetic resin selected from the group consisting of vinylic, acrylic, styrenic and urethane resins and which normally has a minimum film temperature higher than room temperature on said porous substrate and (b) 2 to 40 parts by weight of an organic liquid which is a swelling agent for said resin, said liquid consisting of 70 to 10 percent by weight of at least one monoethylenically unsaturated compound selected from the group consisting of acrylic, methacrylic, vinylic, styrenic and allylic monomers having a boiling point of less than 190°C and 30 to 90 percent by weight of at least one ethylenically unsaturated compound having a boiling point of at least 190°C and selected from the group consisting of acrylic and methacrylic esters obtained by partial or complete esterification of polyalcohols, allylic esters of polybasic acids, maleic-unsaturated acids, maleic-unsaturated acid anhydrides and divinyl- or polyvinyl-substituted aromatic hydrocarbons.

14. An article according to claim 13 wherein said coating contains at least one member of the group consisting of pigments and fillers.

15. An article according to claim 13 wherein said coating contains at least 0.05 percent by weight of a photo initiator and a UV-transparent filler and wherein said final hardening of said film is done by exposure to UV radiation.

16. An article according to claim 13 wherein said coating contains at least 0.05 percent by weight of a photoinitiator and wherein said final hardening of said film is done by exposure to UV radiation.

17. A process for the preparation of the article of claim 1 comprising coating said substrate with a mixture of said organic liquid and an aqueous dispersion of said synthetic resin to form a film on said substate and exposing said film-coated substrate to UV- or electron-radiation to harden said film.

18. A process according to claim 17, wherein said aqueous dispersion comprises 20 to 60 percent by weight of said synthetic resin.

* * * * *